(12) United States Patent
He et al.

(10) Patent No.: US 7,545,738 B2
(45) Date of Patent: Jun. 9, 2009

(54) NETWORK TELEPHONY SYSTEM WITH ENHANCED INTERCONVERSION OF AUDIO SIGNALS AND IP PACKETS

(75) Inventors: Tang He, Shenzhen (CN); Degang Wei, Shenzhen (CN); Gongqian Wang, Shenzhen (CN); Xianji Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 988 days.

(21) Appl. No.: 10/829,908

(22) Filed: Apr. 21, 2004

(65) Prior Publication Data

US 2005/0013305 A1    Jan. 20, 2005

(30) Foreign Application Priority Data

Jul. 18, 2003    (TW) .............................. 92119710 A

(51) Int. Cl.
*H04J 1/16* (2006.01)
*H04L 12/66* (2006.01)
(52) U.S. Cl. .................. 370/230; 370/235; 370/356
(58) Field of Classification Search .............. None
See application file for complete search history.

(56) References Cited

U.S. PATENT DOCUMENTS 6,359,902 B1 * 3/2002 Putzolu .................. 370/466
6,449,269 B1 * 9/2002 Edholm .................. 370/352
6,628,644 B1 * 9/2003 Nelson et al. ............ 370/352
6,847,634 B1 * 1/2005 Pearce et al. ............. 370/352
6,950,467 B2 * 9/2005 Yoo ..................... 375/240.12
6,970,479 B2 * 11/2005 Abrahamsson et al. ...... 370/477
7,095,715 B2 * 8/2006 Buckman et al. ........... 370/230

FOREIGN PATENT DOCUMENTS

CN    1336752 A    2/2002
CN    1368823 A    9/2002

* cited by examiner

*Primary Examiner*—Melanie Jagannathan
(74) *Attorney, Agent, or Firm*—Wei Te Chung

(57) ABSTRACT

A telephony system (10) for communication over a network includes a kernel space (110), a media express processor operating environment (120) for providing a set of software facilities for task synchronization, and a user space (130). The kernel space includes a board support package (111), a ucLinux module (112), a digital signal processor interface module (113), a transfer control protocol/Internet protocol (TCP/IP) stack (114) for performing TCP/IP, and a real-time transport protocol/real-time transport control protocol module (115). The user space includes a digital signal processor manager (132), an H.323/session initiation protocol (H.323/SIP) stack (133) for performing H.323 protocol or SIP, a system managing module (134), an event dispatcher (135), a line state machine (136), a call manager (137), a call logging module (138), and a directory module (139) for storing, editing, searching and removing contact information of users.

9 Claims, 3 Drawing Sheets

NETWORK TELEPHONY SYSTEM WITH ENHANCED INTERCONVERSION OF AUDIO SIGNALS AND IP PACKETS

BACKGROUND OF THE INVENTION

1. Field of the Invention

The present invention relates to a telephony communication system, and more particularly to a computer network telephony system.

2. Description of Related Art

Conventional network telephone communication is developed on the basis of an IP (Internet Protocol) network. A conventional network telephone system employs a normal fixed-line type of telephone set as a terminal. A service gateway converts audio signals transmitted from the normal telephone into IP packets, which are then transmitted over the IP network. Since the IP packets need not monopolize a particular communication channel, the cost of a long-distance telephone call using the network telephone system is greatly reduced.

However, the service gateway is generally provided by a telecommunication service provider, which charges subscribers for the service gateway. As a result, the cost of a short-distance telephone call using the network telephone system may be higher than the cost of making the same call using a normal telephone line. That is, the low-cost advantages of the network telephone system are generally limited to long-distance calls, and exclude short-distance calls. In addition, the service gateway may have to deal with a vast number of active subscribers during peak periods. At such times, the service gateway is liable to switch to a busy status, in which it is not able to cope with more call requirements. Newly active subscribers are made to wait.

Consequently, what is needed is a network telephony system that can convert the audio signals into the IP packets without the need for a service gateway.

SUMMARY OF THE INVENTION

Accordingly, a primary object of the present invention is to provide a telephony system for reliable and low-cost communication over a network.

In order to fulfill the above-mentioned primary object, the present invention provides a telephony system for reliable and low-cost communication over a network. The telephony system comprises a kernel space, a media express processor operating environment for providing a set of software facilities for task synchronization, and a user space. The kernel space comprises a board support package, a ucLinux module, a digital signal processor interface module, a transfer control protocol/Internet protocol (TCP/IP) stack for performing TCP/IP, and a real-time transport protocol/real-time transport control protocol (RTP) module. The user space comprises a digital signal processor manager, an H.323/session initiation protocol (H.323/SIP) stack for performing H.323 protocol or SIP, a system managing module, an event dispatcher, a line state machine, a call manager, a call logging module, and a directory module for storing, editing, searching and removing contact information of users.

Other objects, advantages and novel features of the present invention will become more apparent from the following detailed description when taken in conjunction with the accompanying drawings, in which:

DETAILED DESCRIPTION OF THE INVENTION

Figure 1:
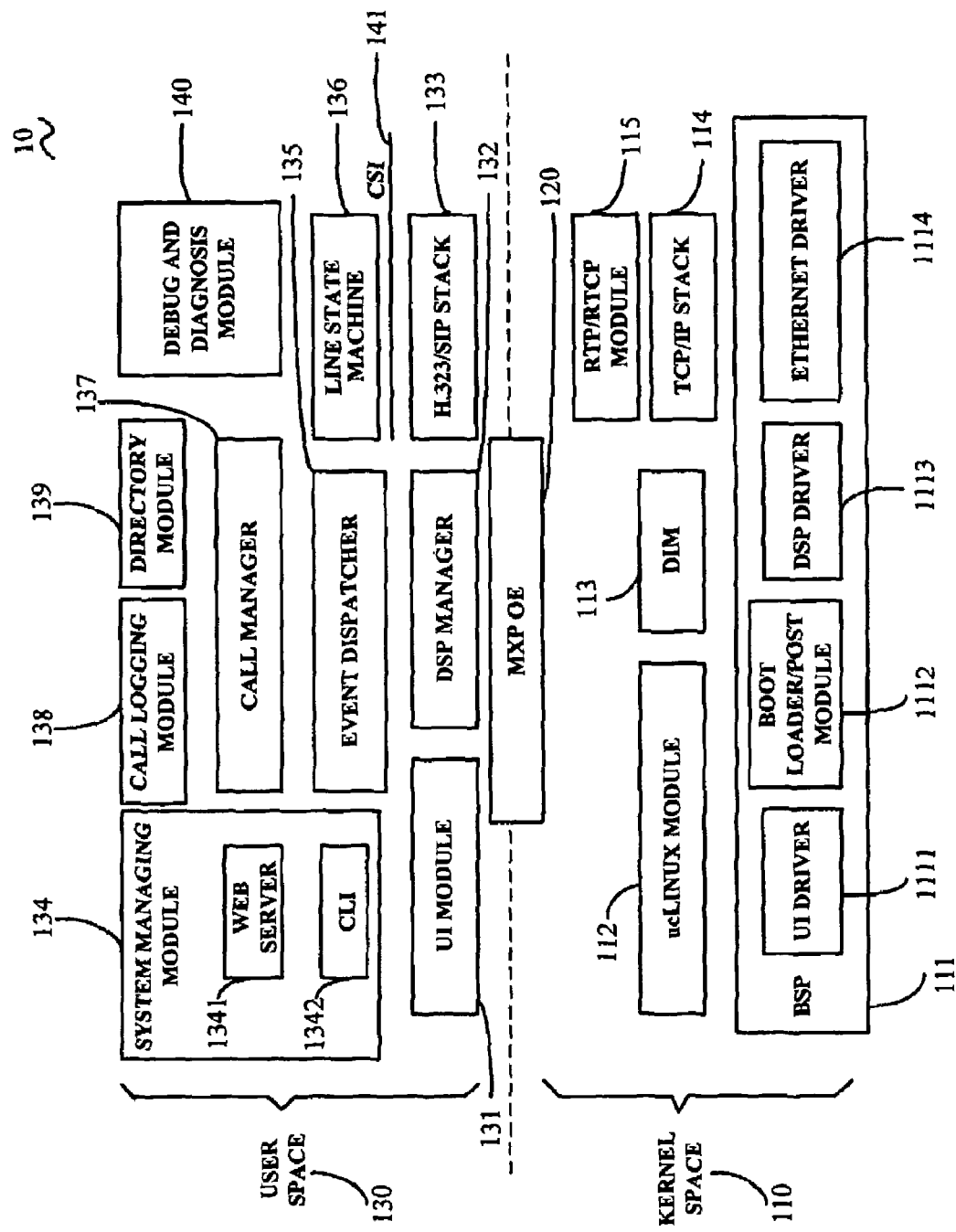
FIG. 1 is a schematic diagram of software infrastructure of a network telephony system according to the present invention.

FIG. 1 is a schematic diagram of software infrastructure of a network telephony system 10 for reliable and low-cost communication according to the present invention. The network telephony system 10 comprises a kernel space 110, a media express processor operating environment (MXP OE) 120 and a user space 130, located in that order from inside to outside. The kernel space 110 comprises a board support package (BSP) 111 for running a real-time operating system on a target hardware platform, a ucLinux module 112, a digital signal processor interface module (DIM) 113, a transfer control protocol/Internet protocol (TCP/IP) stack 114, and a real-time transport protocol/real-time transport control protocol (RTP/RTCP) module 115. The BSP 111 comprises a user interface (UI) driver 1111, a boot loader/power-on self test (POST) module 1112, a digital signal processor (DSP) driver 1113, and an Ethernet driver 1114. The ucLinux module 112 is a Linux kernel for providing tasks, interruptions and memory management functions. The DIM 113 provides a communication interface between a digital signal processor (not shown) and a microprogrammed control unit (not shown). The TCP/IP stack 114 is used for performing TCP/IP. The RTP/RTCP module 115 is used for unpacking an RTP packet from a network (not shown) into an IP packet, and transmitting the IP packet to the DIM 113. The RTP/RTCP module 115 is also used for packing an IP packet from the DIM 113 into an RTP packet, and transmitting the RTP packet to the network. The MXP OE 120 is an optional abstraction layer for providing a set of software facilities for task synchronizations.

The user space 130 comprises a UI module 131, a digital signal processor (DSP) manager 132 for controlling and monitoring the digital signal processor, an H.323/session initiation protocol (SIP) stack 133 for performing an H.323 protocol or SIP, a system managing module 134, an event dispatcher 135 for transmitting an event message to a user, a line state machine 136 for setting up and controlling a call connection over the network, a call manager 137, a call logging module 138, a directory module 139 for storing user contact information, and a debug and diagnosis module 140 for initializing and monitoring system hardware.

The UI module 131 provides an access interface for the user, and comprises a keypad driver (not shown) for scanning a keypad and debouncing key presses entered by the user, a display manager (not shown) for controlling display hardware such as a liquid crystal display (LCD), and audio input/output drivers for controlling audio hardware such as a speaker, a handset and a ringer. The system managing module 134 comprises a web server 1341 and a command line interface (CLI) 1342, for providing an interface for system configuration, administration and maintenance. A call signaling interface (CSI) 141 between the H.323/SIP stack 133 and the line state machine 136 offers an application programming interface (API) for initiating and terminating a call connection. The call manager 137 is responsible for dealing with call events. The call events comprise requests by users to set up call connections over the network, and termination of call connections by users. The call logging module 138 is for storing call information, such as successful connection information and unsuccessful connection information. The directory module 139 provides an interface for the system managing module 134 and the call manager 137 to store, edit, search and remove the user contact information.

Figure 2:
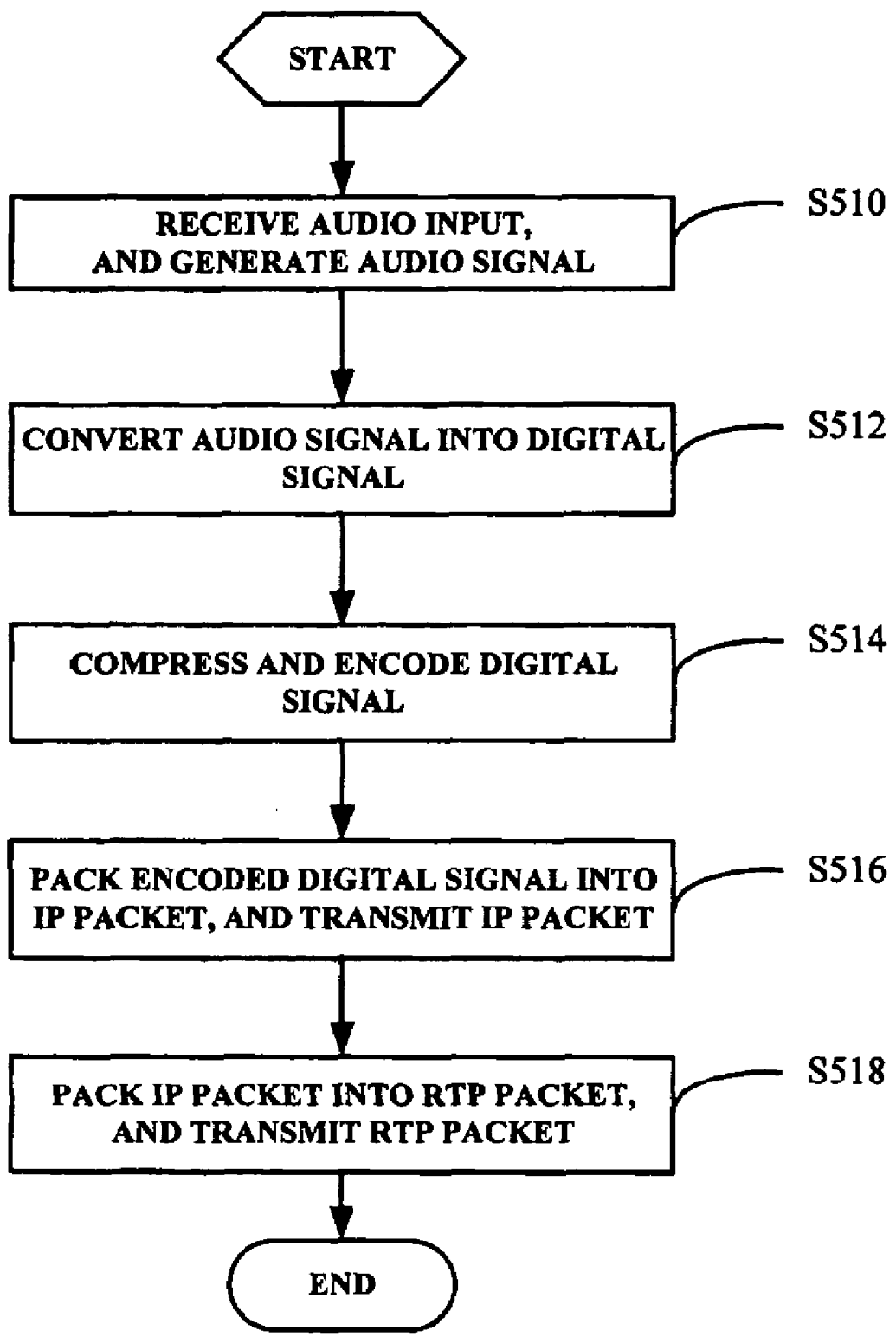
FIG. 2 is a flow chart of an exemplary method for transmitting an audio signal to a network according to the present invention.

FIG. 2 is a flow chart of an exemplary method for transmitting an audio input to a network according to the present invention. The network telephony system 10 is set into operation before it transmits the audio input. Simultaneously, the BSP 111, the ucLinux module 112, the MXP OE 120, the event dispatcher 135 and the debug and diagnosis module 140 start up for supporting the operation of hardware. At step S510, the UI module 131 receives an audio input from a user, and generates a corresponding audio signal. The user can run the system managing module 134, the call manager 137, the call logging module 138 or the directory module 139 according to his/her needs. At step S512, the DIM 113 converts the audio signal into a digital signal. At step S514, the DIM 113 compresses the digital signal and encodes the compressed digital signal. At step S516, the DIM 113 packs the encoded digital signal into an IP packet, and transmits the IP packet to the RTP/RTCP module 115. At step S518, the RTP/RTCP module 115 packs the IP packet into an RTP packet, and transmits the RTP packet to the network.

Figure 3:
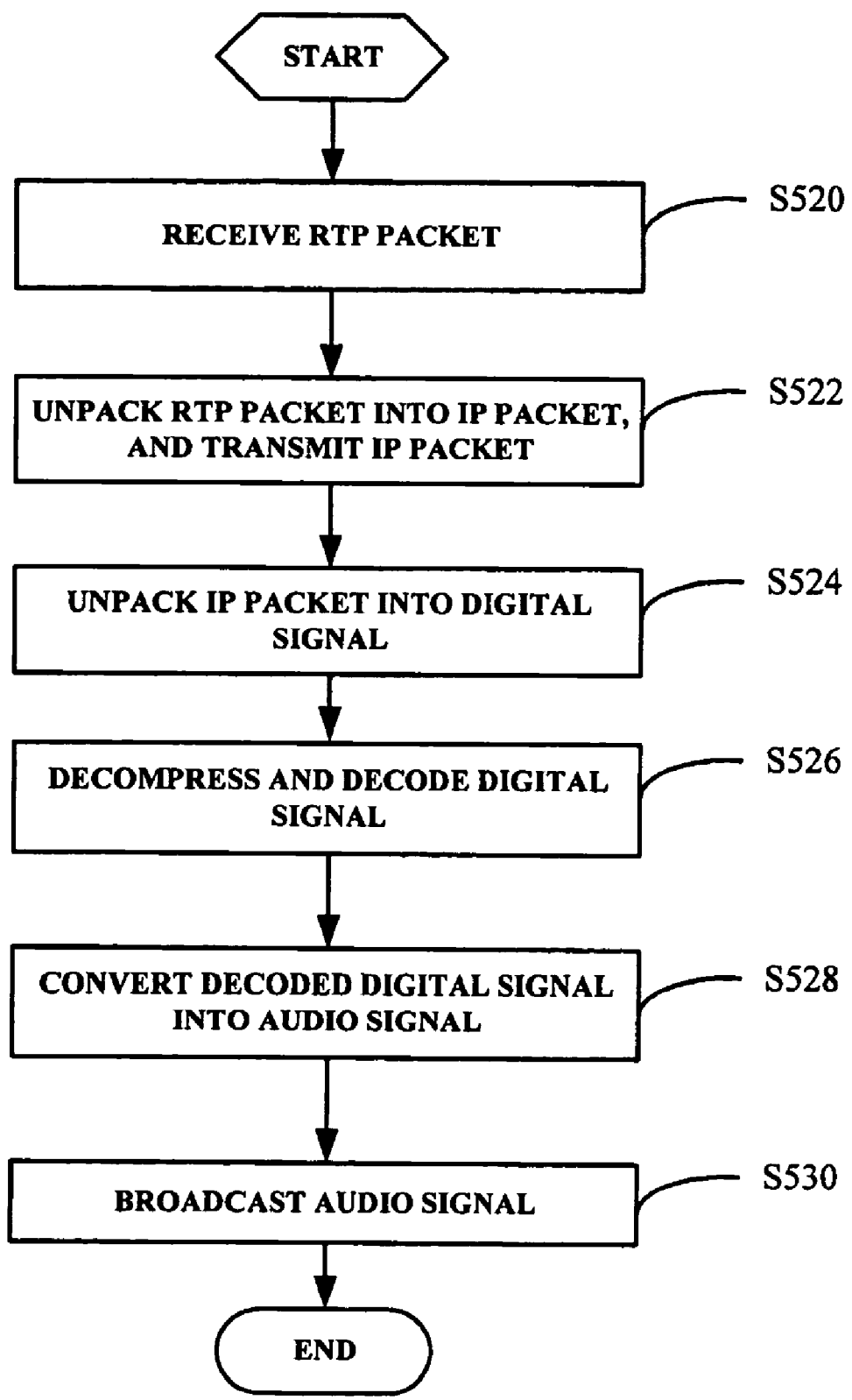
FIG. 3 is a flow chart of an exemplary method for recovering an audio signal according to the present invention.

FIG. 3 is a flow chart of an exemplary method for recovering an audio signal according to the present invention. At step S520, the RTP/RTCP module 115 receives an RTP packet from the network. At step S522, the RTP/RTCP module 115 unpacks the RTP packet into an IP packet, and transmits the IP packet to the DIM 113. At step S524, the DIM 113 unpacks the IP packet into a digital signal. At step S526, the DIM 113 decompresses the digital signal and decodes the decompressed digital signal. At step S528, the DIM 113 converts the decoded digital signal into an audio signal. At step S530, the UI module 131 broadcasts the audio signal.

While a preferred embodiment and preferred methods of the present invention have been described above, it should be understood that they have been presented by way of example only and not by way of limitation. Thus the breadth and scope of the present invention should not be limited by the above-described exemplary embodiment and method, but should be defined only in accordance with the following claims and their equivalents.

What is claimed is:

1. A telephony system for communication over a network, the telephony system comprising:
 a kernel space comprising:
  a board support package for running a real-time operating system on a target hardware platform;
  a ucLinux module for providing tasks, interruptions and memory management functions;
  a digital signal processor interface module for compressing and encoding a digital signal into an Internet protocol (IP) packet, and for decompressing and decoding an IP packet into a digital signal;
  a transfer control protocol/Internet protocol (TCP/IP) stack for performing TCP/IP; and
  a real-time transport protocol/real-time transport control protocol (RTP/RTCP) module for unpacking an RTP packet into an IP packet, and for packing an IP packet into an RTP packet;
 a media express processor operating environment for providing a set of software facilities for task synchronization; and
 a user space comprising:
  a digital signal processor manager for controlling and monitoring a digital signal processor;
  an H.323/session initiation protocol (H.323/SIP) stack for performing H.323 protocol or SIP;
  a system managing module for providing an interface for system configuration, administration and maintenance;
  an event dispatcher for transmitting an event message to a user;
  a line state machine for setting up and controlling a call connection over the network;
  a call manager for dealing with call events, the call events comprising requests by users to set up call connections over the network, and termination of call connections by users;
  a call logging module for storing call information; and
  a directory module for storing, editing, searching and removing contact information of users.

2. The telephony system as claimed in claim 1, wherein the board support package comprises a boot loader/power-on self test module, a digital signal processor driver and an Ethernet driver.

3. The telephony system as claimed in claim 1, wherein the board support package comprises a user interface driver.

4. The telephony system as claimed in claim 3, wherein the user space further comprises a user interface module fix providing an access interface for users.

5. The telephony system as claimed in claim 4, wherein the user interface module comprises a keypad driver for scanning a keypad and debouncing key presses entered by users, a display manager for controlling display hardware, and audio input/output drivers for controlling audio hardware.

6. The telephony system as claimed in claim 1, wherein the user space further comprises a debug and diagnosis module for initializing and detecting system hardware.

7. The telephony system as claimed in claim 1, wherein the system managing module comprises a web server.

8. The telephony system as claimed in claim 1, wherein the system managing module comprises a command line interface.

9. The telephony system as claimed in claim 1, wherein the user space further comprises a call signaling interface for initiating and terminating the call connection.

* * * * *